No. 851,448. PATENTED APR. 23, 1907.
D. S. SMITH.
REVERSING GEAR FOR TRACTION ENGINES.
APPLICATION FILED OCT. 3, 1906.
2 SHEETS—SHEET 1.
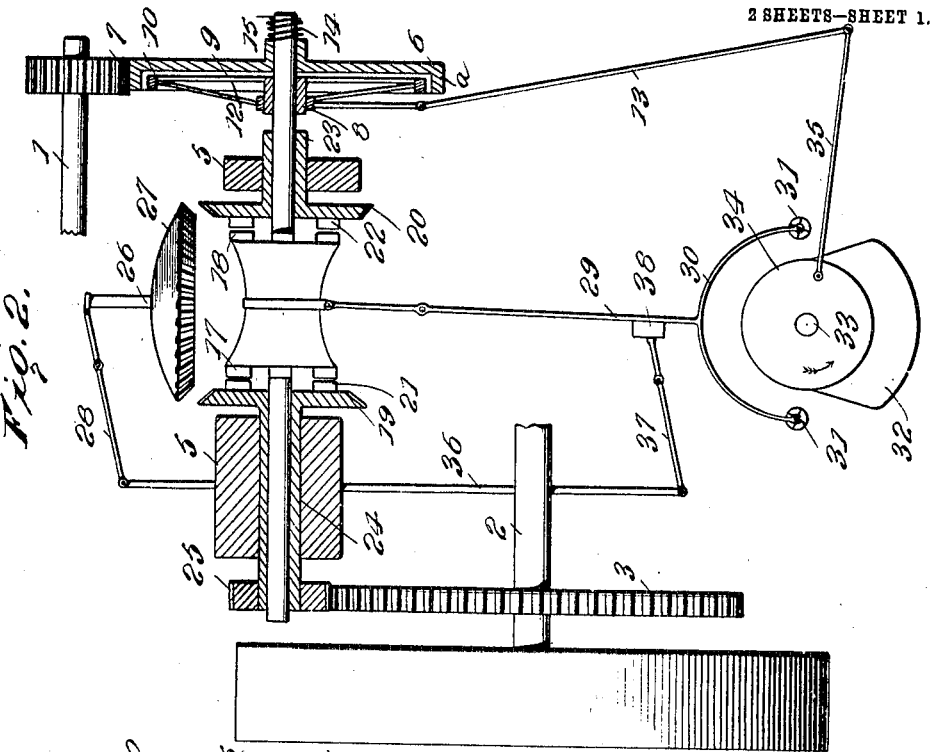
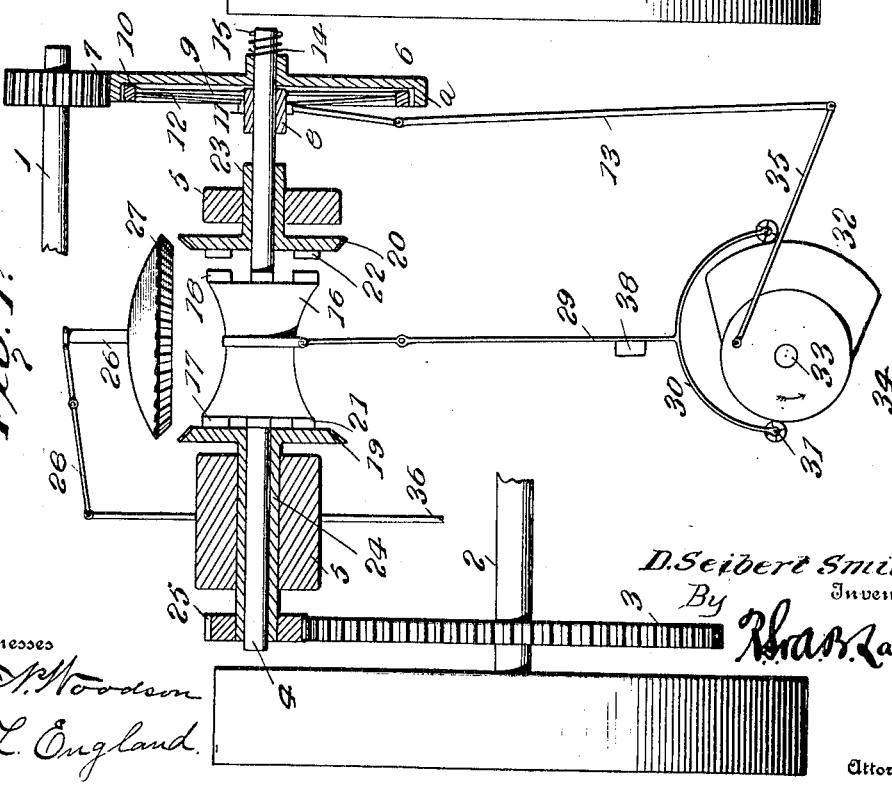
D. Seibert Smith
Inventor
Witnesses
Attorneys

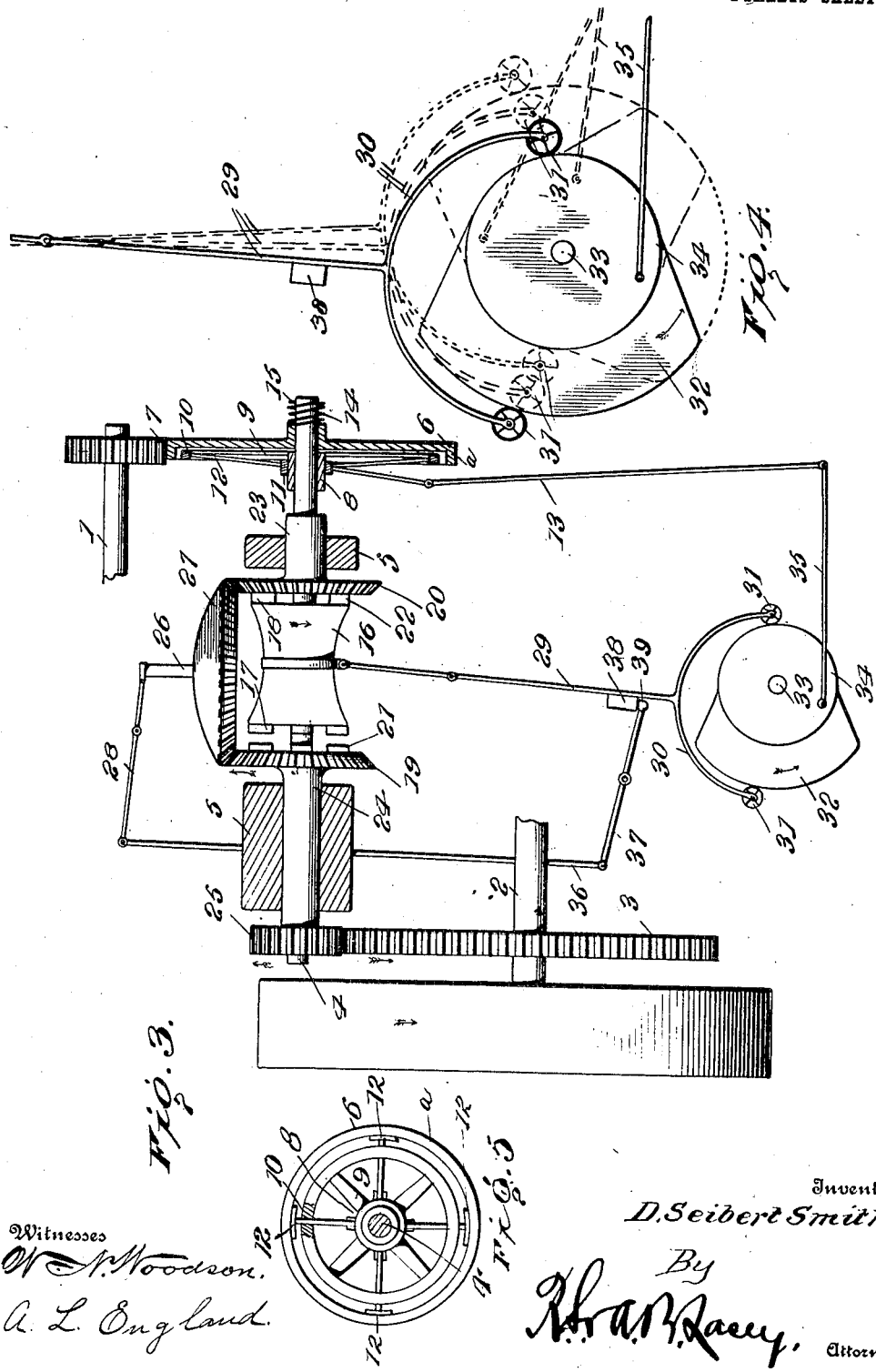

UNITED STATES PATENT OFFICE.

DAVID SEIBERT SMITH, OF MERCERSBURG, PENNSYLVANIA.

REVERSING-GEAR FOR TRACTION-ENGINES.

No. 851,448.  Specification of Letters Patent.  Patented April 23, 1907.

Application filed October 3, 1906. Serial No. 337,251.

*To all whom it may concern:*

Be it known that I, DAVID SEIBERT SMITH, a citizen of the United States, residing at Mercersburg, in the county of Franklin and State of Pennsylvania, have invented certain new and useful Improvements in Reversing-Gear for Traction-Engines, of which the following is a specification.

This invention aims to provide a mechanism especially designed for traction engines which will admit of the same being instantly reversed without producing shock or causing undue strain upon the working parts, and which will minimize the friction and reduce the wear and tear of the power transmitting devices to the smallest amount possible.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a detail view of a reversing gearing for traction engines, automobiles and the like, showing the relation of the parts when the machine is driven forward. Fig. 2 is a view of the mechanism illustrated in Fig. 1, showing the gear thrown out of action. Fig. 3 is a view similar to Fig. 1, showing the gearing reversed. Fig. 4 is a detail view of the clutch operating lever showing the cam cooperating therewith, the three positions being shown by full and dotted lines. Fig. 5 is a detail view of the clutch between the counter shaft and the gear element loosely mounted thereon and having the driving power applied thereto.

Corresponding and like parts are referred to in the following description and indicated in all the views of the drawings by the same reference characters.

The drive shaft 1 may have movement imparted thereto from any type of engine in the accustomed way. The drive axle 2 may be provided with a gear 3 of any type. A countershaft 4 is arranged intermediate of the drive shaft 1 and drive axle 2 and is mounted in suitable bearings 5. A gear wheel 6 loose upon the countershaft 4, is in mesh with a pinion 7 fast to the drive shaft 1 so as to rotate with said shaft when motion is imparted thereto. A collar or sleeve 8 is fast to the countershaft and is provided with arms 9 which are connected at their outer ends to a rim 10. The cog rim of the gear wheel 6 projects laterally so as to overlap the rim 10 and is smooth upon its inner side and constitutes a clutch member *a* with which cooperate movable clutch members 12 forming parts of a clutch interposed between the countershaft and the gear wheel to cause said parts to rotate together when the gearing is in active operation either to impel the machine forward or drive the same backward. A collar 11 is splined to the collar or sleeve 8 and the arms 12 have connection therewith and are adapted to operate through openings in the rim 10 and are finished so as to engage at their outer ends with the inner side of the laterally extended rim *a* of the gear wheel 6 to cause said gear wheel and the countershaft to rotate together.

A shipper lever 13 has connection with the collar 11 to effect movement of said collar when it is required to throw the clutch into and out of engagement accordingly as it may be required to impart motion to the countershaft 4 or to release the same from clutched engagement with the gear wheel 6. When the gear wheel 6 is in clutched engagement with the countershaft 4, the parts are positively driven, but when the clutch is thrown out of action, any unusual or abnormal resistance applied to the countershaft 4, will cause the same to remain stationary while the gear wheel 6 may continue to rotate so long as the drive shaft 1 is in motion. There is a frictional engagement between the gear wheel and the countershaft to cause the latter to rotate when the clutch is thrown out of action. This frictional engagement is brought about by means of a spring 14 arranged to exert a lateral pressure upon the gear wheel 6, whereby it is forced into frictional contact with the collar or sleeve 8. The spring 14 is of the coil and expansible type and is mounted upon the countershaft 4 between the hub of the gear wheel 6 and a stop 15 applied to said countershaft. It is to be understood that the frictional contact between the gear wheel 6 and the collar 8 is sufficient to cause rotation of the countershaft when the gearing is thrown out of action.

A double ended clutch 16 is mounted upon the countershaft 4 and is splined thereto and consists of a collar or sleeve provided at opposite ends with teeth or clutch elements 17 and 18. Gear wheels 19 and 20 are loose upon the countershaft and are provided upon their inner faces with teeth or clutch elements 21 and 22, whereby the clutch 16 and one or the other of the gear wheels may rotate as one part according to the position of said clutch. The gear 20 is provided with a sleeve 23 through which the countershaft 4 loosely passes and which obtains a mounting in the bearing 5. The gear wheel 19 is provided with a sleeve 24 through which the countershaft 4 passes and which is mounted in a bearing 5. The pinion 25 fast to the sleeve 24 is in mesh with the gear 3 and transmits motion to said gear either in a forward or a backward direction dependent upon whether the clutch 16 is in engagement with the gear 19 or the gear wheel 20. A post or stub shaft 26 is provided with an idler 27 having meshing relation with the gear wheels 19 and 20 so as to transmit motion from one to the other. The post or stub shaft 26 is movable and is adapted to be shifted by means of a lever 28 so as to throw the idler 27 into or out of engagement with the teeth of the gear wheels 19 and 20. When the gearing is moved so as to impart a forward movement to the machine, the lever 28 is operated to throw the idler 27 out of engagement with the gear wheels 19 and 20, thereby permitting the parts 27 and 20 to remain inactive with the result that wear thereon is obviated and a certain percentage of power conserved.

For shifting the clutch 16, a lever 29 is provided and is supplied at one end with a yoke 30 having anti-friction rollers 31 at its ends. A cam 32 cooperates with the yoke 30 to effect movement of the lever 29 and is secured to a shaft 33 conveniently positioned and provided with a hand wheel or other device to be conveniently grasped to admit of rotating the shaft 33. A crank wheel 34 is fast to the shaft 33 and is connected by pitman 35 with the lever 13, hence upon turning of the shaft 33 both levers 13 and 29 are simultaneously operated for actuation of the clutches 16 and 12.

When the clutch 16 is moved to the position shown in Fig. 1, it is in engagement with the gear wheel 19, hence said gear wheel, its sleeve 24 and the pinion 25, are rotated in a direction to impart forward movement to the machine. At this time the idler 27 may be and is preferably thrown out of engagement with the gear wheels 19 and 20. To reverse the machine, the clutch 16 is moved to bring the clutch elements 18 and 22 into engagement and the idler 27 is caused to mesh with the gear wheels 19 and 20, hence movement is transmitted from the countershaft 4 through the clutch to the gear wheel 20 and thence through the idler 27 to the gear wheel 19, causing it to rotate in a reverse direction to the countershaft. When the clutch is moved to an intermediate position, as indicated in Fig. 2, the engine or machine is stationary, since no positive movement is transmitted from the countershaft to either of the gear wheels 19 or 20. At this time the frictional engagement of the gear wheel 6 with the sleeve 11 will cause the countershaft to rotate, thereby enabling interlocking of the clutch elements or teeth when operating the clutch 16 to throw it into engagement with either of the gear wheels 19 or 20.

To obviate liability of breaking the cogs of the gear wheels 19, 20 and 27, as well as to prevent release or disengagement of the idler 27 from the gear wheels 19 and 20, the means illustrated and now being described have been devised. A rod or bar 36 connects the lever 28 with a lever 37 having a reinforced end 39 for cooperation with a block 38 made fast to the clutch operating lever 27. When the clutch 16 is moved to an intermediate position so as to clear the clutch elements of the gear wheels 19 and 20, the end of the lever 37 bears against the outer side of the block 38, and at this time the stub shaft 26 bearing the idler 27 is moved so as to throw said idler out of engagement with the teeth of the gear wheels 19 and 20, as shown most clearly in Fig. 2. When the clutch 16 is moved into clutch engagement with the gear wheel 20 and the idler 27 is moved into meshing relation with the cog teeth of the gear wheels 19 and 20, the end of the lever 37 engages under the block 38, as indicated in Fig. 3, thereby preventing movement of the idler 27 to throw it out of engagement with the cooperating gear wheels 19 and 20.

The construction is such as to enable the mechanism being used in the capacity of a powerful brake, since upon operating the lever 13 the collar 11 may be moved to bring the arms or clutch members 12 in frictional engagement with the inner surface of the laterally extended rim of the gear wheel 6.

Having thus described the invention, what is claimed as new is:

1. In gearing of the character specified, the combination of a countershaft, gear elements 6 and 25 loose thereon, the one the recipient of power, the other disposing of the power imparted thereto, a clutch between the gear wheel 6 and the countershaft, gear elements 19 and 20 loose upon the countershaft, the gear element 19 having connection with the gear element 25 an idler adapted to transmit motion from one gear element 20 to the other gear element 19, a clutch splined to the countershaft and adapted to make positive engagement with either of the gear elements 19 or 20, and means for operating the two clutches to connect the gear element 6 and either of the gear elements 19 or 20 with the countershaft according as the machine is to be employed in a forward or a backward direction.

2. In reversing gearing for traction engines and the like, the combination of a countershaft, gear elements 6 and 25 loose thereon, the one having power applied thereto, the other expending said power, a clutch between the gear element 6 and the counter shaft gear elements 19 and 20 loose on the countershaft, the gear element 19 having connection with the gear element 25 intermediate connecting means between the gear elements 19 and 20 for transmitting motion from one to the other, a clutch 16 splined to the countershaft and adapted to make positive engagement with either of the loose gear elements 19 or 20, frictional engaging means between the gear element 6 and the countershaft to cause rotation of the latter when the aforesaid clutches are thrown out of operation, and operating means for the aforementioned clutches.

3. In gearing of the character specified, the combination of a countershaft, gear elements 6 and 25 loose thereon, the one receiving power, the other expending the power applied thereto, a clutch between the gear element 6 and the countershaft, gear elements 19 and 20 loose on the countershaft, means for transmitting motion from one of said gear elements to the other, a clutch 16 splined to the countershaft and adapted to make positive engagement with either of the gear elements 19 or 20, levers 29 and 13 for the aforesaid clutches, a yoke cooperating with the lever 29, a shaft, a cam fast to said shaft and cooperating with the yoke, and a pitman having crank connection with the shaft provided with the cam and connected to the lever 13.

4. In gearing of the character specified, the combination of a shaft, gear elements loose thereon, a clutch splined to said shaft and adapted to cooperate with each of said gear elements to secure one or the other to the said shaft, an idler adapted to be thrown into and out of engagement with the said gear elements, a clutch operating lever, a lever for moving said idler, and an intermediate cooperating lock mechanism between the two members to secure the idler in either one of its two extreme positions to prevent injury to the cooperating cog teeth.

In testimony whereof I affix my signature in presence of two witnesses.

DAVID SEIBERT SMITH. [L. S.]

Witnesses:
W. H. SMITH,
LEWIS C. TROUT.